(12) United States Patent
Sullivan et al.

(10) Patent No.: US 10,321,350 B2
(45) Date of Patent: Jun. 11, 2019

(54) RATE ADAPT ALGORITHM FOR A WIRELESS CONNECTION

(71) Applicant: Cambium Networks Limited, Ashburton, Devon (GB)

(72) Inventors: Daniel Sullivan, Elmhurst, IL (US); Oleksandr Andrusenko, Bila Tserkva (UA); Sergii Topchii, Kiev (UA)

(73) Assignee: CAMBIUM NETWORKS LIMITED, Ashburton Devon (GB)

( * ) Notice: Subject to any disclaimer, the term of this patent is extended or adjusted under 35 U.S.C. 154(b) by 42 days.

(21) Appl. No.: 14/463,382

(22) Filed: Aug. 19, 2014

(65) Prior Publication Data

US 2016/0057647 A1 Feb. 25, 2016

(51) Int. Cl.
| | | |
|---|---|---|
| *H04W 28/02* | (2009.01) | |
| *H04W 28/04* | (2009.01) | |
| *H04L 1/00* | (2006.01) | |
| *H04W 24/08* | (2009.01) | |
| *H04L 1/16* | (2006.01) | |

(52) U.S. Cl.
CPC ....... *H04W 28/0242* (2013.01); *H04L 1/0016* (2013.01); *H04L 1/0019* (2013.01); *H04L 1/1607* (2013.01); *H04W 24/08* (2013.01); *H04W 28/04* (2013.01); *H04L 1/0003* (2013.01); *H04L 1/0009* (2013.01)

(58) Field of Classification Search
CPC ... H04W 72/085; H04W 72/06; H04W 28/22; H04L 1/0019; H04L 47/10; H04L 47/14; H04L 47/25; H04L 1/20; H04L 12/5601; H04L 47/266; H04L 49/90; H04L 49/901; H04L 49/9031
See application file for complete search history.

(56) References Cited

U.S. PATENT DOCUMENTS

| | | | |
|---|---|---|---|
| 6,445,680 B1 * | 9/2002 | Moyal ................. | H04L 12/5601 370/236 |
| 7,369,510 B1 | 5/2008 | Wong et al. | |
| 2004/0001462 A1 * | 1/2004 | Yavuz .................. | H04L 1/0002 370/333 |
| 2006/0114858 A1 * | 6/2006 | Walton ................ | H04B 7/0417 370/335 |
| 2008/0117814 A1 | 5/2008 | Popescu | |
| 2009/0190558 A1 | 7/2009 | Strutt | |

(Continued)

OTHER PUBLICATIONS

R. Combes, et al., Optimal Rate Sampling in 802.11 Systems, The 33rd Annual IEEE International Conference on Computer Communications (INFOCOM'14), Apr. 27-May 2, 2014, Toronto, Canada, 8 pages.

(Continued)

*Primary Examiner* — Noel R Beharry
*Assistant Examiner* — Wilfred Thomas
(74) *Attorney, Agent, or Firm* — Brinks Gilson & Lione

(57) ABSTRACT

In a radio device, an automatic repeat request circuit communicates data messages to remote radio devices at selected data rates. Responses to the data messages are collected and statistics developed about success rates of the data messages at the selected data rates. A current data rate is selected based on the statistics and a packet is transmitted. The data rate can be adapted using the statistics about success rates of the data messages.

10 Claims, 7 Drawing Sheets

(56) References Cited

U.S. PATENT DOCUMENTS

2011/0299408 A1* 12/2011 Gunawardena ..... H04W 72/085
370/252
2012/0155415 A1* 6/2012 Seok ..................... H04L 1/0003
370/329

OTHER PUBLICATIONS

S. Wu, et al., Loss Differentiated Rate Adaptation in Wireless Networks, Auburn University Technical Report CSSE07-02, Jan. 15, 2007, 8 pages.
J. Bicket, Bit-rate Selection in Wireless Networks, Massachusetts Institute of Technology, Feb. 2005, 50 pages.
D. Kim, et al., Optimal Modulation and Coding Scheme Selection in Cellular Networks with Hybrid-ARQ Error Control, IEEE Trans. on Wireless Communications, vol. 7, No. 12, Dec. 2008, p. 5195, 7 pages.
International Search Report and the Written Opinion from corresponding international application No. PCT/GB2015/052297, 8pp., dated Jan. 27, 2016.
Ioannis Pefkianakis et al. MIMO Rate Adaptation in 802.11n Wireless Networks, Proceedings of the Sixteenth Annual International Conference on Mobile Computing and Networking, Mobicom '10, p. 257, Sep. 1, 2010.
Xia Dong et al., Evaluation of the Minstrel Rate Adaptation Algorithm IEEE 201.11g WLANDs, 2013 IEEE International Conference on Communications (ICC) IEEE, pp. 2223-2228, Jun. 9, 2013.

\* cited by examiner

RATE ADAPT ALGORITHM FOR A WIRELESS CONNECTION

BACKGROUND

The present application relates generally to wireless communication. More specifically, the present application relates to system and method for adapting communication data rate in a wireless connection.

Wireless communication systems have been developed to provide relatively low-cost radio communication to users in a variety of locations. Such wireless communication systems typically operate according to one or more wireless standards. The wireless standard defines the communication flow between radios in a system including message format and content and timing. Examples of such wireless standards include cellular telephone standards such as the Global System for Mobile Communication (GSM) and wireless standards such as Institute of Electrical and Electronic Engineers (IEEE) standard 802.11 and its variants. Other examples abound.

A typical wireless communication system includes one or more fixed base stations or access points which provide radio communication to a geographic area surrounding the base station or access point. One or more subscriber modules in the geographic area establish radio communication with the base station or access point to receive communication services. The communication services received by subscriber modules may include one or both of voice services and data services. The base station or access point may have separate network access for internet access and call management. Some systems, such as cellular systems, provide handoff of calls between base stations so that the subscriber modules may be mobile.

Such communication systems may use licensed bands of frequencies or unlicensed bands of frequencies. Typically, a cellular system uses a licensed band. The system operator generally has exclusive use and control over radio communications for a specified band of channels for a specified geographic region. Smaller wireless systems are typically unlicensed. Any radio in the area may begin communicating.

Interference may occur and must be accommodated for radios operating in unlicensed bands. For example, a radio communicating with another, distant radio may suddenly be exposed to transmissions from a third, nearby radio. Because of proximity, the nearby radio may be received as a much stronger signal then the distant radio, generating errors in received data. Such interferers must be accommodated for reliable communication.

Such problems and other problems in radio communication systems and method are addressed in the present disclosure.

BRIEF SUMMARY

A radio device and a method for a radio device provide in one embodiment for transmitting packets from the radio device at a current data rate. Error data is collected to estimate packet error rates for the radio device. Weight values are determined for each data rate and a maximum weight value is identified. A best rate value is selected as the data rate associated with the maximum weight value and the best rate value may be used to transmit a subsequent packet from the radio device.

In another embodiment, in a radio device, an automatic repeat request circuit communicates data messages to remote radio devices at selected data rates. Responses to the data messages are collected and statistics developed about success rates of the data messages at the selected data rates. A current data rate is selected based on the statistics and a packet is transmitted. The data rate can be adapted using the statistics about success rates of the data messages.

In another embodiment, a method for a radio device includes probing at different data rates for successful communication over a radio link. Success percentages for each rate are determined and data stored. An estimate is made of throughput for the link for each data rate. The data rate that gives maximum data throughput for the link is selected for subsequent packet transmissions from the radio device.

These and other advantages, aspects and novel features of the present invention, as well as details of an illustrated embodiment thereof, will be more fully understood from the following description and drawings.

DETAILED DESCRIPTION OF THE PRESENTLY PREFERRED EMBODIMENTS

Figure 1:
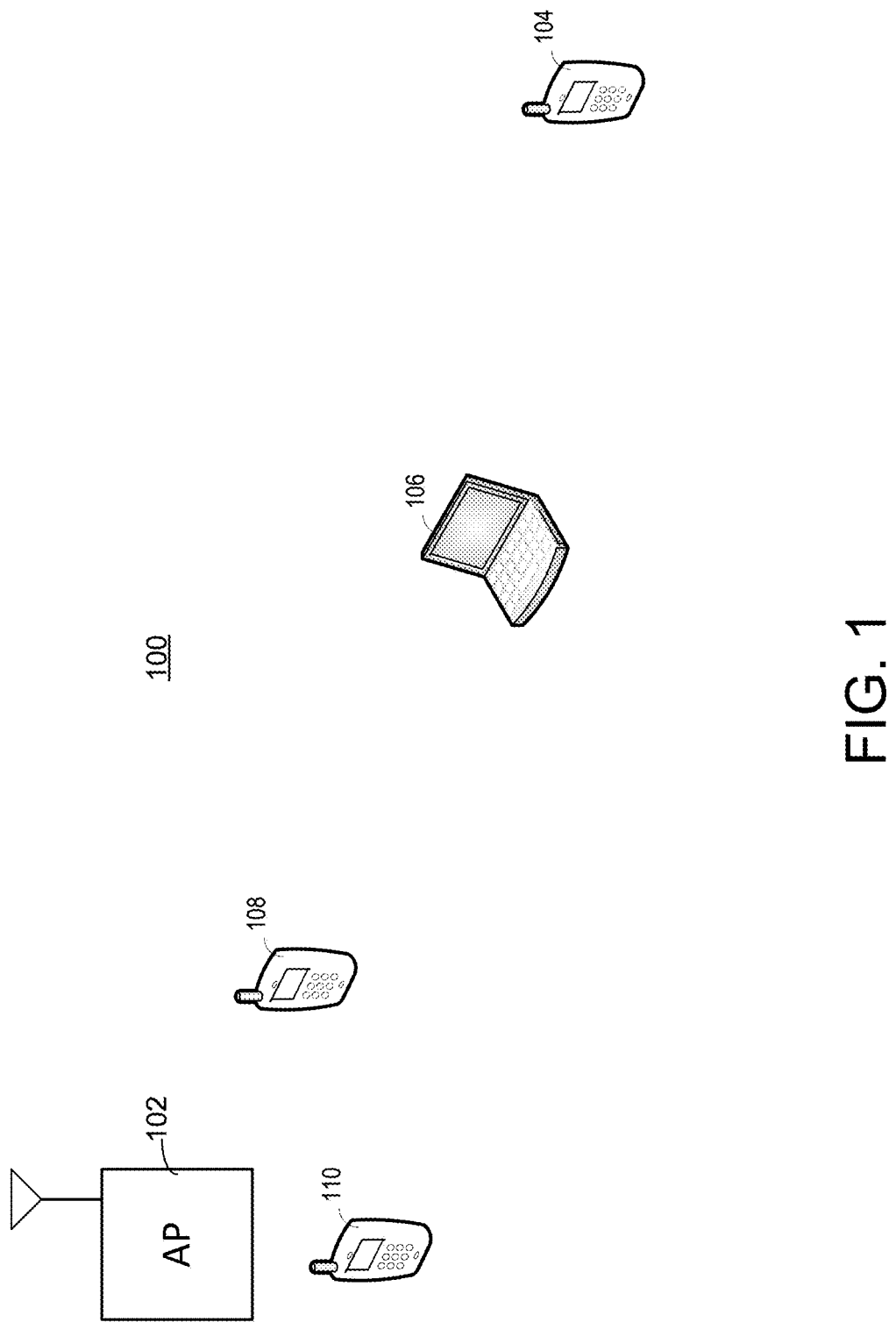
FIG. 1 is a block diagram of an example radio communication system.

A system and method are disclosed for optimizing a rate adapt algorithm over a wireless link to support an interference environment in addition to traditional non-interference environments. The rate adapt algorithm allows two communicating radios to tailor communication to a changing environment. When possible, the rate of data exchange is increased under the rate adapt algorithm. In the presence of interference or other factors, the rate of data exchanged is adjusted under the rate adapt algorithm to achieve higher throughput by using higher rates in the presence of interference. The rate of data exchange is adapted to the environment on a real-time or near-real time basis.

Rate adapt algorithms over wireless environments typically support non-interference environments or are designed based on these types of environments. A non-interference environment is one where only two radios are active at a given time on a channel, a transmitter and a receiver. Multiple access rules control and limit other radios from accessing the channel and creating interference.

One standard for measuring interference on a channel is Carrier to Interference and Noise Ratio (CINR). CINR defines the level that a radio frequency (RF) carrier is heard compared to environmental noise and other RF Interferers added together. The higher the CINR, the louder the carrier is heard. Higher CINR is required for higher rate of data exchange. Higher rates of data exchange are considered more aggressive but are conventionally more desirable. Higher rates of data exchange enhance user convenience and more efficiently use scarce resources such as radio channels. Where one or both of the linked radios is battery powered, a higher rate of data exchange can reduce current drain and extend battery life.

One standard for defining the rate of data exchange is referred to as the Modulation and Coding Scheme (MCS). MCS defines how bits are sent over the RF medium. An exemplary MCS that may be considered are conventionally referred to as MCS1 through MCS15 specified by IEEE 802.11n. In this definition, each MCS level is defined by the modulation type, the error correction rate, and the number of streams that are sent for an RF subcarrier. The modulation types are 64-QAM which sends six bits for each symbol, 16-QAM which sends four bits for each symbol, and QPSK which sends two bits for each symbol. The error correction rates include 5/6, 3/4, 2/3, and 1/2. For example, then, when using 5/6 error correction, five data bits are sent and one error correction bit is sent for every six bits. The number of streams being sent refers to the number of independent data paths sent over the radio channel. One stream means one data path and two streams means two data paths. Thus, in this example, MCS15 uses 64-QAM 5/6 over two RF streams sends 10 bits (i.e. 5*2) for every symbol. MCS1 which uses QPSK 1/2 over one RF streams sends 1 bit (i.e. 1*1) for every symbol. In this example, MCS15 provides the highest rate of data exchange and MCS1 provides the lowest rate of data exchange.

Depending on current channel conditions, then, the receiver and transmitter negotiate a particular data rate to use. In the current example using MCS definitions, the receiver and the transmitter or some other network entity selects a best current MCS level. As conditions change, the MCS level is changes or adapted to the changing conditions, even on a frame-by-frame basis. As the distance between transmitter and receiver grows, for example, the MCS level may be reduced. As other environmental noise decreases, for another example, MCS level may be increased. One operational goal is to increase to the highest MCS level possible while maintaining reliable communication.

One measure of reliable communication in a radio channel is link budget. The link budget defines how much an RF signal degrades in power between two radios. The power of a radio signal from a transmitting radio to a receiving radio may be referred to as Receive Signal Strength Indication (RSSI). RSSI defines the level that an RF signal is received at. Typically in a 20 MHz channel, RF signals can be received between −95 dBm (very low, the level of the inherent noise of the environment) and −40 dBm (very loud, above which a radio starts to receive errors with the signal). RSSI pertains both to the intended signal a radio wants to hear and any interference signals a radio does not want to hear. Typically, high link budgets can provide higher RSSI and low link budgets can provide lower RSSI.

A conventional measurement of errors in a radio channel is Packet Error Rate (PER). PER defines the percentage of errors encountered when data is sent over the RF medium at a specific MCS. One operational goal is to reduce or minimize PER. One method for achieving this goal is adapting the MCS level to current conditions including interference.

In an unlicensed environment, interference can be a substantial problem. In a licensed environment, the spectrum owner can control all channel access and substantially eliminate all interference. Such control is not possible in an unlicensed environment. Even in relatively uncrowded spaces, with few radios present, interference is not a substantial problem. However, in some environments, multiple access points can be established in the same geographic area to create multiple wireless internet service provider networks competing for the same unlicensed channels. For example, these channels are generally in the bands at 2.4 GHz and 5.0 GHz. Other radios on the channel are referred to as interferers with respect to a particular transmitter and receiver.

When an interferer becomes active and begins transmitting, the CINR decreases substantially, causing loss of transmitted packets. The conventional response to packet loss is retrying transmission of the packets. This has been successful in that all packets will usually be received on the fourth or fifth retry, even in a high-interference environment.

Conventional rate adapt algorithms do not account for interferers on the channel. As a result the conventional rate adapt algorithm often modifies the selection of the MCS rate based on the current PER and the link budget. The rate adapt algorithm adjusts to a less aggressive rate MCS with less throughput when PER increases and adjusts to a more aggressive MCS with greater throughput when PER decreases. If there is no interference in an environment, the closer radios get together, the higher the CINR they experience which implies that a more aggressive MCS can be expected to send data without having PER increase. MCS adjustment is done on a stair-step basis, with progressively lower MCS levels being tried as PER increases and progressively higher MCS levels being tried as PER decreases.

However, in interference environments, interferers may be operating and create RF noise (i.e., interference) such that a respective transmitter and receiver cannot reliably hear each other when the interferers are transmitting. These interferers may be intermittent or constant and may be loud (i.e. have a high RSSI at the receiver) or soft (i.e. have a low RSSI at the receiver). There also may be multiple interferers. This can cause CINR to vary for a receiver.

Therefore, in interference environments, selection of a most-appropriate MCS or other data rate may be based on both the interference present at any given moment and link budget. The present disclosure creates a rate adapt algorithm that considers both interference and link budget to choose the optimal MCS such that overall throughput of the connection between radios is maximized.

In accordance with some embodiments, a method for a rate adapt algorithm probes different data rates or MCS level to learn what is the best MCS level to use for a particular time. The probes may be in the form of Automatic Repeat reQuest (ARQ) data messages or data communications. The method includes determining success percentages for MCS levels based on the response to the probes. All MCS levels may be probed or a subset of MCS of the MCS levels may be probed. The method also includes determining an estimated throughput for each MCS. Further, the method includes selecting the MCS level that gives the maximum throughput for a link. The maximum throughput for current conditions may be referred to as the goodput.

The method further includes, during short time periods, probing to see if packets were received successfully at each selected data rate or MCS level so the transmitting radio can dynamically adapt to a changing environment including interferers.

The probes may be any data that is sent or received or combination of data that is sent or received. In some embodiments, the probes are regular data that is normally sent between a transmitting radio and a receiving radio over a radio link. For example, an automatic repeat-request process may be put in place in which the transmitting radio sends a frame and waits for receipt of an acknowledgement transmission from the receiving radio. The acknowledgement transmission may be referred to as an ACK. If the receiving radio successfully receives the packet, it responds with an ACK message. Success of receipt may be determined by any error detection or correction technique. If the receiving radio receives the packet but with errors, it may responds with a non-acknowledgement transmission, referred to as a NACK. The transmitting radio can respond to receipt of the NACK from the receiving radio by retransmitting the same packet. Also, if the transmitting radio does not receive either an acknowledgment transmission or a non-acknowledgement transmission (no ACK or NACK), the transmitting radio does not know whether the packet was not received at all by the receiving radio or if it was received but a subsequent ACK message was unsuccessfully transmitted by the receiving radio. The transmitting radio can retransmit the packet. Either a non-acknowledgement or no acknowledgement can be treated by the transmitting radio as lack of an acknowledgement of the communicated frame from the receiving radio.

The transmitting radio maintains a metric based on acknowledgment transmissions it receives or lack of acknowledgement transmissions it receives. This can be done, for example by counting ACK and NACK messages from the receiving radio and storing a count or other data indicative of the success of transmission and receipt over the link to the remote radio. The stored data is indicative of a percentage of successful packet transmissions.

Further, this process of probing can be done at different MCS levels or data rates. In this manner, the transmitting radio can track success rate based on received ACK messages, NACK messages or no received message. Statistics can be derived and stored in the transmitting radio. This can also be done for a set time period or for varying time periods, so that when interference is likely or has been detected, more probe data is obtained and stored. In this manner, the data rate or MCS level for the link can be selected dynamically and rapidly.

The technique can be used by radios at both ends of the link. A radio communication includes two different link sessions. These may be termed the downlink, from an access point (AP) to a subscriber module (SM) and an uplink from the SM to the AP. Both the AP and the SM may perform the method of adapting data rate as described herein. Each respective rate adapt algorithm performed by the AP and the SM is independent because each receiver sees different interference. If the AP and SM are physically close, such as less than 100 meters, they will likely see the same interferers. Due to availability of directional antennas, it is possible to see different interferers on the AP and the SM even if distance between the AP and the SM is small. Typically, however, the two radios are not close and will see different interferers. The radio on the link that sends the data and receives the ACK or NACK (or no response) decides which rate to select using the rate adapt algorithm.

Accordingly, the method and system disclosed herein enable determining what rate for communication of data on a radio link based on the data received back over the link from the intended receiver. This rate selection is done even in an uncontrolled, interference-based environment.

Referring now to the drawing, FIG. 1 shows a simplified block diagram of an example radio communication system 100. The radio communication system 100 is an example system that includes wireless devices and networks that may implement a combination of methods described herein to implement a rate adapt algorithm which dynamically accommodates presence of interfering devices. In FIG. 1, the radio communication system 100 includes an access point 102, a first subscriber module (SM) 104, a second subscriber module 106, a first interferer 108 and a second interferer 110. In the illustrated embodiment, the AP 102 communicates with the first SM 104 and the second SM 106 using a physical layer (PHY) based on Institute of Electrical and Electronic Engineers (IEEE) 802.11n. However, the radio communication system 100 is intended to be exemplary only and is intended for the illustration of certain operational points to be described below. The devices and procedures described herein are intended to be used with the widest variety of networks including network topologies and data communication technologies. For example, in one embodiment, a radio system uses a PHY that is based on IEEE 802.11 (i.e. data is transmitted over 52 subcarriers and symbol time is 4 μsec), but the media access control (MAC) layer used is time division duplex (TDD, i.e. a frame with downlink and uplink parts).

The AP 102 provides radio communication to a service area surrounding the AP 102. In the illustrated embodiment, the AP 102 operates according a Time Division Duplex (TDD) protocol defined as a frame (e.g. 5 msec in length) with both downlink (DL) and uplink (UL) sub-frames. These sub-frames are composed of separate timed opportunities allocated to specific SMs. The devices and techniques described herein may be extended to standards and protocols including IEEE 802.11n.

In the example of FIG. 1, the AP 102 operates as a base station for radio devices within a cell or service area surrounding the AP 102. In this example, the access point 102 provides radio communication service to one or more subscriber modules including SM 104 and SM 106 near the access point. As used herein, radio communication generally refers to the communication of data by the transmission and reception of radio frequency signals representative of the data. Each subscriber module, SM 104 and SM 106 communicates with the access point 102 using a radio communication protocol such as TDD. The radio communication protocol defines frequency allocation, timing, frame structure and other characteristics of the transmission and reception of information between radio devices including the access point 102 and other radio devices including SM 102 and SM 104.

In the example of FIG. 1, the access point 102 is in radio communication with two radio devices, including a first subscriber module, SM 104, and a second subscriber module, SM 106. The subscriber modules SM 104 and SM 106 may be considered clients of the access point 102 and may be referred to as wireless client devices. An access point such as AP 102 and its corresponding wireless client devices SM 104 and SM 106 may be referred to as a wireless network. While FIG. 1 shows two subscriber modules in radio communication with the access point 102, this is intended to be exemplary only. Any number of subscriber modules may communicate with the AP 102. Also, the subscriber modules illustrated in FIG. 1 may selectively leave the wireless network and re-enter the network and other subscriber modules may enter the wireless network as well.

Each of SM 104 and SM 106 may include a radio communication circuit in combination with any other suitable device or equipment. Exemplary devices that may include a radio circuit and form a subscriber module or wireless client device include a mobile phone, a smart phone, a personal digital assistant (PDA), a laptop computer, a tablet computer, a personal computer and any other data processing device, or a fixed radio device located in a home, business or other area requiring data communications access. In the example of FIG. 1, SM 104 is embodied as a mobile phone and SM 106 is embodied as a laptop computer. For each of SM 104 and SM 106, a radio circuit provides data communication between the data processing device and the access point 102. The radio circuit may be a hardware or software module or component or group of components and may be a permanent part of the subscriber module or may be removable or detachable from the subscriber module.

The access point 102 may, in turn, provide data communication between respective subscriber modules among the SM 104 and the SM 106, or between a respective subscriber module and another network such as the internet. The arrangement of access point 102 and subscriber modules SM 104 and 106 is referred to as a point to multi-point (PMP) arrangement or scheme. The network may be any network or combination of networks and may include directly or indirectly the Internet or networks in communication with the Internet.

Figure 2:
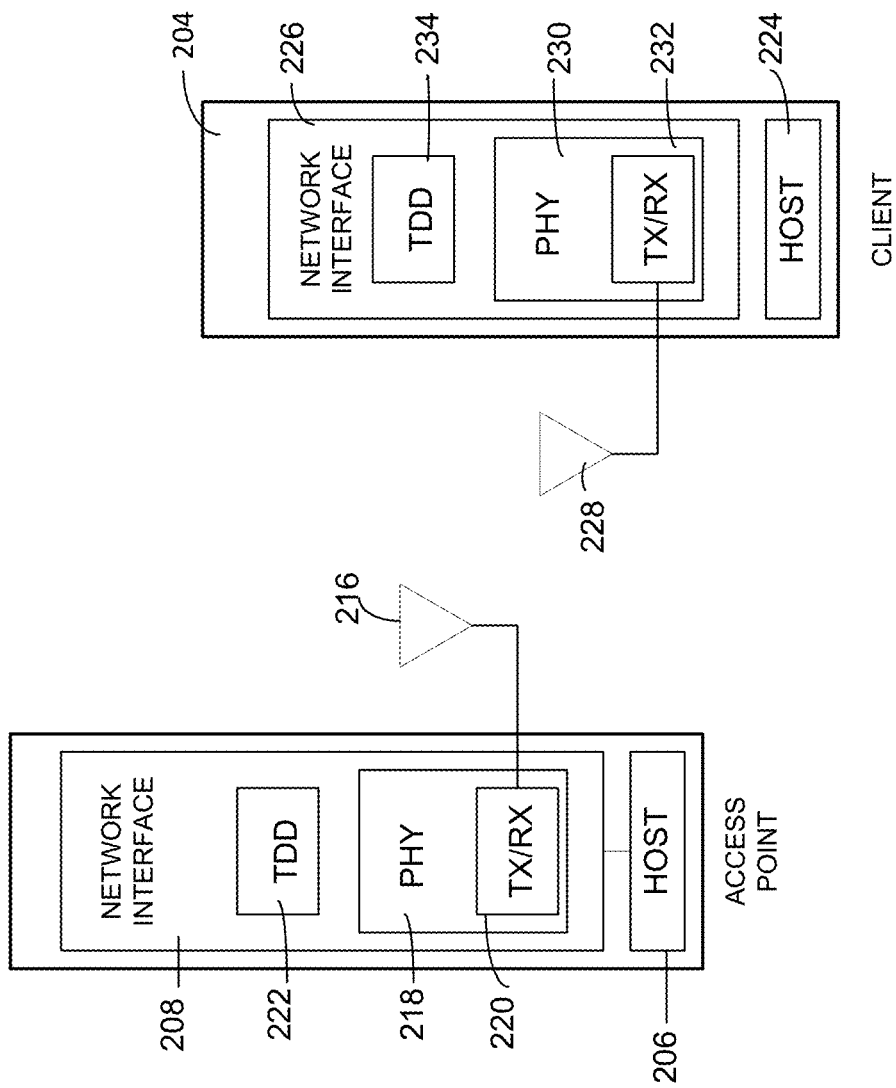
FIG. 2 is a more detailed block diagram of two exemplary radios operating in the radio communication system of FIG. 1.

FIG. 2 is a block diagram of a representative access point 202 and representative subscriber module 204. The access point 202 may be of form AP 102 of FIG. 1. Similarly, the subscriber module 204 may be representative of one of SM 104 or SM 106 in FIG. 1. However, the embodiments shown are intended to be exemplary only.

The access point 202 includes a host processor 206, a network interface 328 and an antenna 216. In other embodiments, the access point 202 may include more or fewer or alternative elements relative to those shown in FIG. 2.

The host processor 206 controls operation of the access point 202. The host processor 206 may include one or more circuits, modules, interfaces or code for implementing control functions. For example, the host processor 206 may include a microprocessor and memory. The memory may store data and instructions for controlling the microprocessor and other components of the access point 202. The microprocessor in turn may operate in response to the stored data and instructions to control operation of the access point.

The network interface 208 controls data communication between the access point 322 and other devices, including the subscriber module 204. The network interface 208 controls wireless communication using the antenna 216. In this regard, the network interface 208 may implement one or more radio circuits to transmit and receive radio communications by means of the antenna 216. The network interface 208 implements a physical layer (PHY) 218 in accordance with the Open Systems Interconnection (OSI) model of computer networking and a transmitter and receiver circuit (TX/RX) 220. In some embodiments the network interface 208 may be implemented in a single commercial semiconductor device or chipset. Examples of such chipsets include Avastar 88W8764 and Atheros AR9002U UB94.

The transmitter portion of TX/RX 220 is adapted to transmit a radio signal representation of the downlink frame of a TDD frame. The transmitter portion of TX/RX 220 may apply the appropriate modulation and coding schemes (MCS) as specified by the 802.11 standard to the downlink frame before transmission. The transmitter portion may also include mixers, frequency synthesizers, digital to analog convertors, power amplifier etc.

The receiver portion of TX/RX 220 is configured to receive radio signal representations of uplink frames of TDD frames. The receiver decodes the radio signals to recover the uplink data. The receiver includes amplifiers, automatic gain control circuits, IF amplifiers, demodulators etc. The receiver may also measure characteristics of the received radio signals including the receive signal strength (RSSI), the signal to noise ratio (SNR) of a received radio signal and the carrier interference and noise ratio (CINR). Further, the network interface 208 implements a time division duplex (TDD) module (MAC) 222. The TDD module 222 may control the operation of the PHY 218 including configuring the appropriate MCS.

In one embodiment, the network interface 208 implements the IEEE 802.11n protocol, including the 802.11n PHY layer. The network interface 208 may also or instead implement other data communication protocols for both wireless and wire line communication. For example, the network interface 208 may control communication to other wire line network elements such as a wireline Ethernet network. In this regard, the network interface may implement protocols such as Ethernet or internet protocol (IP) for communication with other network elements.

The network interface 208 may include data processing circuits such as one or more processors, circuits, interfaces, modules and memory for implementing network control and communication. The network interface 208 may be programmed with data and instructions to perform the functions described herein. Moreover, the network interface 208 may include analog circuitry such as amplifiers, oscillators and filters for data communication with the antenna 216.

The antenna 216 may be any suitable device or combination of devices for transmission and reception of signals. In one example, the antenna 216 is a multiple-input, multiple-output (MIMO) antenna array for data communication. In one particular embodiment, the antenna 216 is configured for communication at frequencies such as 2.4 GHz, and 5 GHz.

The subscriber module 204 includes a host processor 224, a network interface 226 and an antenna 228. In other embodiments, the client device 204 may include other components providing other functionality.

The host processor 224 controls operation of the client device 204. The host processor 224 may include one or more circuits, modules, interfaces or code for implementing control functions. For example, the host processor 224 may include a microprocessor and memory. The memory may store data and instructions for controlling the microprocessor. The microprocessor in turn may operate in response to the stored data and instructions to control operation of the client device 204.

The network interface 226 includes circuits that control data communication between the client device 204 and other devices, including the access point 202. The network interface 226 includes circuits that control wireless communication using the antenna 228. In this regard, the network interface 226 may implement one or more radio circuits to transmit and receive radio communications by means of the antenna 228. In the illustrated embodiment, the network interface 226 implements a physical layer (PHY) 230 as well as a transmitter and receiver circuit (TX/RX) 232. Further, the network interface 226 implements a time division duplex (TDD) module 234. The network interface 226 forms a radio circuit for radio communication with a remote access point or other radio device.

In one embodiment, the network interface 226 implements a derivative of the IEEE 802.11n protocol, including the 802.11n PHY layer 230 and a TDD module 234. In this regard, the device 204 forms a subscriber module or SM. The network interface 226 may also or instead implement other data communication protocols for both wireless and wire line communication. For example, the network interface 226 may control communication to other components of the client device 204.

The network interface 226 may include data processing circuits such as one or more processors, circuits, interfaces, modules and memory for implementing network control and communication. The network interface 226 may be programmed using data and instructions to perform the functions described herein. Moreover, the network interface 226 may include analog circuitry such as amplifiers, oscillators and filters for communication with the antenna 228.

The antenna 228 may be any suitable device or combination of devices for transmission and reception of signals. In one example, the antenna 228 is a multiple-input, multiple-output (MIMO) antenna array for data communication. In one particular embodiment, the antenna 228 is configured for communication at frequencies such as 2.4 GHz and 5 GHz.

The subscriber module 204 may implement a timing circuit that maintains timing and synchronization information for the subscriber module 204. In one example, the client device receives timing or synchronization information periodically from the access point 202. This information may come in the form of a beacon signal or data frame timing element sent with each data frame transmitted by the access point 202. By synchronizing the timing information transmitted in the beacons and data frames to the periodic synchronization event, the local times of the subscriber modules may be synchronized to the periodic synchronization event. The subscriber modules may accordingly schedule the start of their respective portions of uplink frames at appropriate times during the uplink frame.

In operation, the access point 202 and subscriber module 204 are in selective wireless data communication. The access point 202 operates as a base station and provides data communication in a service area adjacent to the access point 202 to client devices or subscriber modules such as the subscriber module 204. Data communication is conducted according to a TDD protocol. The access point 202 operates as a host or server to client devices such as the subscriber module 204 in the service area and establishes a communication network for the subscriber modules in the service area.

Referring again to FIG. 1, first interferer 108 and second interferer 110 represent interferer radio devices that may create radio frequency (RF) interference with communication between the AP 102 and SM 104 or between the AP 102 and SM 106. The radio communication system 100 operates in an uncontrolled, interference-based environment using unlicensed frequencies for radio communication. For example, when radio communication system is embodied as an unlicensed system, communication is on bands in the range of 5.0 GHz and 2.4 GHz. Since these bands are unlicensed, any radio may make use of them and thus will create interference for other radios present in the area, such as the AP 102 and SM 104 and SM 106. That is, interfering radios such as the first interferer 108 and the second interferer 110 may appear or disappear on a radio channel with no warning by turning on a transmitter to communicate data. This may occur at the same time the AP 102 is communicating to SM 104 or SM 106 or both, or at a time when the SM 104 or SM 106 is communicating to the AP 102. In the event of such a simultaneous communication, the intended receiver, either the SM 104 or SM 106 or the AP 102, may receive none or only a portion of the transmission due to interference from the first interferer 108 or the second interferer 110.

The respective radio devices in the radio communication system 100 can control aspects of their communication to optimize data exchange for given circumstances. For example, the AP 102 may assign time slots in a time division, multiple access arrangement so that each subscriber module has a dedicated time period on a frequency. In another example, each transmitting radio may select a data rate of communication and inform its intended receiver of the selected data rate. Higher data rates may be considered more aggressive and will encode each symbol with more bits per symbol. In some systems such as 802.11n, the transmitter may select a Modulation and Coding Scheme (MCS) level. The MCS level defines how bits are sent over the RF medium. The MCS to be considered are MCS1 through MCS15 used by 802.11n. MCS is comprised of the modulation type, the error correction rate, and the number of streams that are sent for an RF subcarrier. Generally, MCS 15 is considered to be a higher data rate than MCS levels with a lower MCS index such as MCS 9 or MCS 1.

A given radio in the radio communication network 100, including the SM 104, will tailor its ratio of carrier to interference and noise (CINR) ratio to ensure reliable receipt of its communications. The transmit level of the carrier may be selected given detected levels of noise and interference. One exemplary goal is to select a CINR of 30 dB for communication using MCS 15 and to select a CINR of 9 dB for communication using MCS 1.

The drawing of FIG. 1 is not intended to be to scale. However, it is intended generally illustrate that first SM 104 is relatively more distant from AP 102 than second SM 106. Also, it is intended to illustrate that the first interferer 108 and the second interferer 110 are relatively closer to the AP 102 than are the first SM 104 and the second SM 106.

For the distant SM 104, there are no nearby interferers. The constraint on successful communication on the downlink is distance from the AP 102. A transmitted carrier wave from the SM 104 is attenuated as it travels to the AP and, for reliable receipt, the SM 104 must select an MCS level suitable for receipt at the distance from the AP 102. For the uplink, interferers close to the AP cause interference similarly for all SMs transmitting to that AP.

A useful measure of channel quality is the ratio of carrier to interference and noise (CINR), measured in dB. A received signal strength has a base level of approximately −95 dB for a 20 MHz channel. If no interference is present, CINR is 30 dB if the signal is received at −65 dB. Thus, CINR declines in the presence of interference and also declines if the received signal strength decreases, either because of distance or fading on the channel.

A given radio in the radio communication network 100, including the SM 104, will tailor its MCS to ensure reliable receipt of its communications. The MCS of the carrier will be selected given detected levels of noise and interference as inferred from the packet error rate (PER). As an example, the distant SM 104, with generally no interferer nearby, will have a fairly constant CINR of 14 and be able to use MCS 10 on the downlink with some selectable variation to MCS 11 and MCS 9.

The nearby SM 106 has several interferers nearby, including first interferer 108 and second interferer 110. If no interferer is active, the nearby SM 106 may have CINR of 30 dB. However, activity by either first interferer 108 or second interferer 110 may cause the CINR of the nearby SM 106 to decrease to 20 dB or even 10 dB. The AP for the downlink must select a MCS level or data rate based on the presence or absence of interference that will give the overall best throughput for a time period.

Throughput is variable and does not vary regularly with MCS level. This is especially true given the time varying and unexpected nature of interference on a channel. The interference will not be constant but will be present for some percentage of time, such as 10 percent or even 90 percent. When the interferer is absent, a fast, aggressive MCS level may be the best choice. For example, given a recurring interference, it may be conventional to shift to a lower MCS level with a less aggressive bits-per-symbol encoding. However, in fact, a more aggressive MCS level with higher data rate and higher bits-per-symbol encoding may successfully complete packet transmission before an interferer returns.

Conventional rate adapt algorithms use link budget as a basis for selecting MCS levels. However, the presence of interference may not be handled well by such conventional algorithms. For example, the presence of an interferer may cause a large number of transmission errors to occur. The conventional algorithm will respond by selecting a lower MCS level. As noted, though, throughput may instead be maximized by instead selecting a more aggressive, higher MCS level.

In accordance with the embodiments disclosed herein, each radio on a link operates to optimize MCS level selection and hence throughput of a rate adapt algorithm where the radios are functioning in a variety of interference environments. The rate adapt algorithm sends test packets out at various MCS levels to understand what the packet error rate (PER) is for all MCS levels used. This allows the rate adapt algorithm to determine for a given communication path between two radios what the best throughput is that can be obtained for all of the MCS level choices.

A few examples help describe the problem solved.

Scenario 1: Traditional link budget constrained link. If a link is limited due to link budget such as when the radios on the link are so far apart that only a conservative MCS will succeed, this algorithm will try a more aggressive MCS level, but PER will be high. It will determine the highest MCS level that will succeed with a low PER and this will maximize throughput by maximizing MCS level.

Scenario 2: The CINR for a link is high, but there are interferers that are always present that raise the noise floor all of the time. Just like in scenario 1, the rate adapt algorithm will determine the highest MCS level that will succeed with a low PER and this will maximize throughput by maximizing MCS level.

Scenario 3: The link budget for a link is high, but there is an interferer that occurs only a percentage such as 10% of the time. When the interferer is there, CINR is low because the radios on the link cannot hear each other due to the interferer and the radios cannot communicate with any MCS level. When the interferer is not there, CINR is high and communication can occur with the most aggressive MCS. In this scenario, the most aggressive MCS is the right one to choose to maximize throughput. Choosing a less aggressive MCS will cause the data to take longer to be sent over the radio link and increase the PER due to increasing the chances of having the interferer occur. Also, the lower MCS will have less throughput even without PER.

An infinite number of scenarios combining interferers and link budget can occur that need to optimize MCS throughput (i.e. measured in bits per symbol) multiplied by (1-PER) to determine what the throughput is for each MCS and hence select the correct MCS level that maximizes throughput.

There is a rate weight for each MCS level and it is an indicator of quality of the MCS. Embodiments of the rate adapt algorithm select an MCS level to use for transmission by choosing the MCS level with the highest rate weight. The rate weight is affected by throughput, success of packets sent, and time since the MCS level was last sent. This allows the right MCS level to be determined for any type of environment such as only link budget-constrained, only interferer-constrained (one or more interferers each with low or high RSSI and varying percentages of when they are present), or some combination of link budget and interferers.

Exemplary rate adapt algorithms described herein use an aging mechanism to increase the rate weight for those MCS levels which were not used for an extended time. This is done because RF and environmental conditions may change over time. For example, an interferer may start or stop or an object might move into or out of the RF path and hence change the link budget.

An Automatic Repeat-request (ARQ) mechanism is used in which packets sent over a wireless medium can be lost and ARQ retries lost packets to make sure they are received. To prevent packet loss over the ARQ mechanism which causes a significant latency increase to data sent, embodiments of the rate adapt algorithm have a mechanism to force a more robust MCS rate (i.e. choose the MCS with the lowest PER) in case the number of undelivered packets starts to grow. This allows loss-sensitive and latency-sensitive protocols, such as Transmission Control Protocol (TCP), to work better in high interference conditions.

Also, embodiments of the rate adapt algorithm contain special processing for cases when there was no traffic for a long time. This processing reduces a "slow start" effect when data transmission starts at an MCS level other than optimal MCS level.

Using the embodiments described herein and extensions thereof, optimal throughput can be obtained for any link between two radios no matter the link budget or interferers present. This allows more data to be sent which is important to Internet Service Providers (ISPs) and their end customers. This increases the efficiency of use of radio resources including channels and circuits that process the radio signals.

The description of embodiments of the rate adapt algorithm follows. This algorithm may be implemented by a data processing device such as the network interface 208 of the access point 202 of FIG. 2 or the network interface 226 of the subscriber module 226 of FIG. 2. A microprocessor or other data processor can implement the algorithm in conjunction with code and data stored in a memory device. The algorithm may be performed as needed and results updated periodically or on any basis.

On each scheduling frame n, the rate adapt algorithm should make a decision of which rate to use for scheduling and for transmitting packets.

Making the decision, the rate adapt algorithm should estimate a weight $q_k(n)$ for each available rate k, and then it should select the rate with the best estimated weight:

$$k(n) = \mathrm{argmax}_k q_k(n)$$

Stage 1. Goodput Selector Over PER Estimates.

$$q1_k(n) = (1 - \mathrm{PERest}_k(n)) \cdot r_k$$

In this equation, $r_k$ is PHY rate of rate k, and $\mathrm{PERest}_k(n)$ is a formula of estimation (aging) of PER based on historical sliding average of PER and its age.

$$PER_k(n) = PER_k(m) \cdot K_{old} + InstantPER \cdot K_{new}$$

$$K_{new} = \frac{K_{amount}}{K_{age} + K_{amount}}$$

$$K_{old} = 1 - K_{new}$$

$$K_{amount} = \frac{sent}{AmountFactor}$$

$$K_{age} = \frac{AgeFactor}{Age_k(n)} - K_{shift}$$

$$InstantPER = 1 - \frac{delivered}{sent}$$

$$Age_k(n) = \min(n - m, 1)$$

where n is number of current scheduling frame, m is number of scheduling frame when previous ACK/NACK message was received for rate k, sent is number of packets sent between scheduling frames m and n on rate $r_k$, delivered is number of packets ACKed in latest ACK/NAME message for rate $r_k$.

AgeFactor, AmountFactor and $K_{shift}$ are configurable parameters with default values as follows:

AgeFactor=10, AmountFactor=20, $K_{shift}$=0.03

Any suitable default values may be used, depending on particular details of an implementation of the rate adapt algorithm.

$PEREst_k(n)$ is calculated as $PER_k(n)$ as if there was sent=1, delivered=1.

Stage 2. PER History Aging. The goal of this stage is to take into account PER history aging. That is, the longer the radio has not used rate k, the higher value the radio would have for $Age_k(n)$, and the higher should be the rate weight. The effect is to tend to select rates with high age values. In other words, this stage defines how often the radio should probe other rates and which rates should be probed. This stage replaces estimation for PER from stage 1, described above.

$$q2_k(n) = f_A(Age_k(n), PER_k(n)) \cdot r_k$$

If the history for rate $r_k$ was updated recently, then the radio can use the PER for this rate without any adjustments. If the history for rate $r_k$ wasn't updated for a sufficiently long time, then the radio may make a preference for this rate, just to update PER history. So $f_A(0,p)$ should be equal to $(1-p)$, while $f_A(\infty,p)$ should be equal to 1.

One formula for other values of age is the following:

$$f_A(a, p) = 1 - \frac{p \cdot c^4}{a^4 \cdot c^4},$$

where c is a configurable parameter for age threshold.

Figure 3:
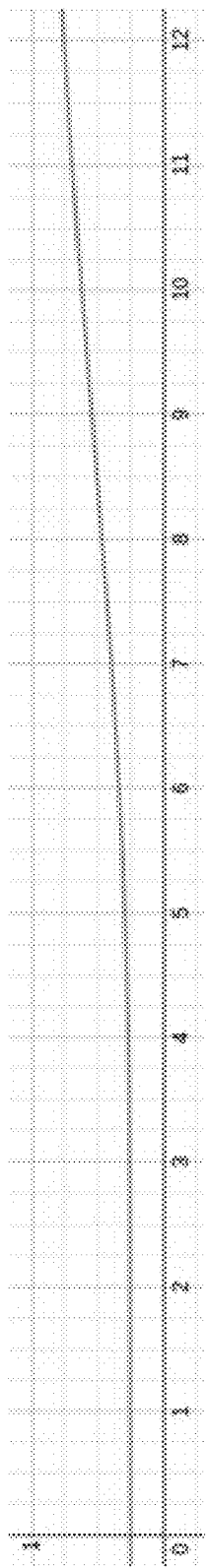
FIG. 3 is a graph showing a first function used in accordance with one embodiment of a rate adapt algorithm.

FIG. 3 shows a graph of the function $f_A(a,p)$ for p=0.75 and c=10. Any suitable value for p and c may be used. In one embodiment, a value of 1000 is used for c.

Stage 4. Number of Retries. The goal of this stage is to consider the number of ARQ retries the radio has made following transmission of a packet that is not received. The more retries occurring, and the higher is a maximum retry number, the more cautious the radio should be to not select rates with high loss probability. This is done so as to not increase latency and to not allow loss to leak through ARQ retries.

Accordingly, a retry index R(n) is introduced to determine how many retries there have been on frame n. Then calculate:

$$q4_k(n) = f_R(R(n), Age_k(n), PER_k(n)) \cdot r_k$$

In some embodiments, the retry index may be normalized and R(n)=0 when there are no retries at all and to R(n)=1 when there are many packets with retry number equal to max_retry, the maximum possible retry number. Any suitable value may be selected as the maximum possible retry number.

Boundary Cases:

R(n)=0. In this case the radio can select any rate, so $f_R$ should be equal to $1-PER_k(n)$;

R(n)=1. In this case the radio should not select rates with high PER, so $f_R$ should be close to 0 if PER is relatively high and close to 1 if PER is relatively low.

In one exemplary embodiment, $$f_R(R, a, p) = \begin{cases} f_A, & \text{if } \{0 \le R \le r_1\} \\ p, & \text{if } \{r_1 < R \le 1\} \text{ and } \{(1-f_A)^{N \cdot (1-R)} \le p_{thr}\} \\ p \cdot c_4, & \text{if } \{r_1 < R \le 1\} \text{ and } \{(1-f_A)^{N \cdot (1-R)} > p_{thr}\} \end{cases}$$

where $a = Age_k(n)$ is an age of rate k, $$R = R(n) = \frac{CurrentRetryNumber}{N}$$

is a retry index, $p = PRR_k(n) = 1 - PER_k(n)$ is a Packet Receive Rate (PRR) on Rate k. Note that this is not the same 'p' variable that was used above in stage2, $f_A = f_A(a, 1-p)$ is a result of stage2 calculation for specified PRR, $r_1$ is a retry index threshold, a proposed value is $$r_1 = \frac{2}{7},$$

N=7 is a number of ARQ retries, $p_{thr}$ is PER threshold (expected PER after 7th retry), a proposed value is $p_{thr} = 0.0001 = 0.01\%$, $c_4$ is bad retry adjustment, proposed value is $c_4 = 0.01$.

Figure 4:
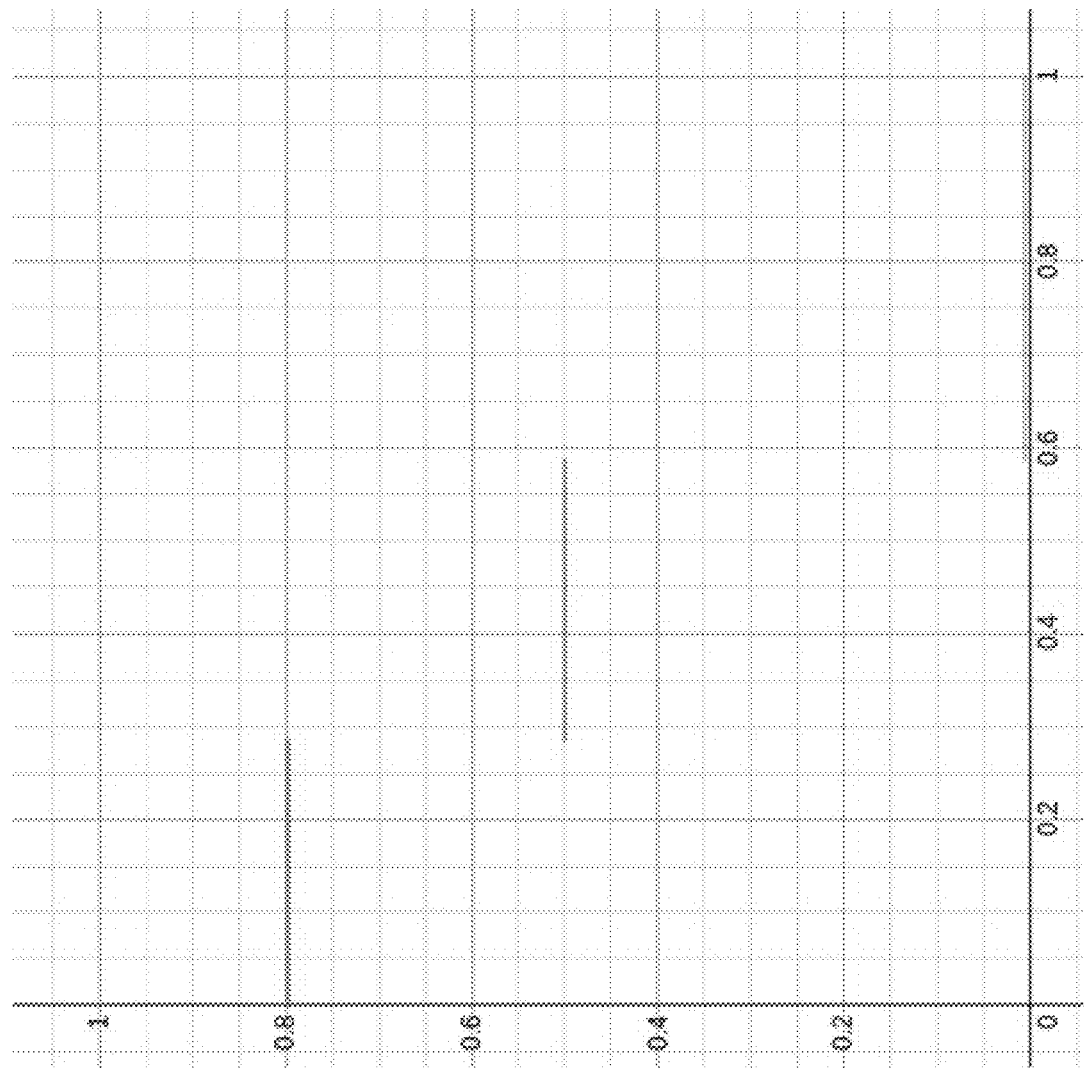
FIG. 4 is a graph showing a second function used in accordance with one embodiment of a rate adapt algorithm.

FIG. 4 shows a graph for p=0.5, age=1100($f_A \approx 0.8$), $$r_1 = \frac{2}{7},$$

$p_{thr} = 0.01 = 1\%$

Stage 6. Low-Volume Data Traffic. Stage 2 (aging) should work fine in cases when there is some constant probe data flow. But if there is no probe data for a long time, then all rates will be affected by aging, and when traffic at last will appear, the $f_A$ formula will return the same or nearly the same value for all rates. In this case, $q_k(n)$ will try to select MCS level 15. But if the channel is bad enough, packets will be lost, retransmitted again and lost again on the same MCS level 15, then retransmitted on MCS level 14, lost again and so on until the number of retries will exceed maximum value and the packet will be dropped.

This case may be especially important in a very simple scenario: ping in idle state. In a ping operation, a transmitter sends a message asking the receiver to respond. In the best case, latency for a ping will be very big; in a bad case, the ping will be lost; and in a very bad case, the ping won't be sent because ARP will be lost. Further, the next ping (or ARP) will be sent only 1 second later. This is a long enough duration so that the same scenario will be repeated for the next ping.

Therefore, special handling is required for this case. One exemplary solution is to modify the age calculation. That is, the age calculation should consider not only the amount of time that has elapsed, but also the number of transmissions that have occurred. The following may be used $$Age6_k(n) = \min\left(age_k(n), sent_k(n) \cdot \frac{c_1}{c_2}\right),$$

where $age_k(n)$—time (number of scheduled frames) passed since last data transmission on rate k, $sent_k(n)$—number of data transmissions on any rate since last transmission on rate k, $c_1$—age threshold, with an exemplary value of 1000 (scheduled frames), $c_2$—transmission threshold, with an exemplary value of 20 (data transmissions).

Therefore, the formula derived above for Stage 2 should be modified as follows:

$$q2_k(n) = f_A(Age6_k(n), PER_k(n)) \cdot r_k$$

Stage 7, Part 1: A Large Number of Bad Possible Data Rates (Reduce Number of Probes). One possible case involves a large number of the possible MCS levels that are unsatisfactory. The processing described above for Stage 2 introduces aging as a way to ensure probes are periodically performed on such bad rates. But if the number of unacceptable MCS levels rates is large enough, an undue amount of time would be spent probing, which is inefficient and to be avoided. Stage 7 of some embodiments of the rate adapt algorithm introduces a process for resolving such a problem.

Stage 7 operates to estimate unknown packet error rate (PER) on a higher rate using known PER value on a lower rate. If estimated PER is high, probing should be avoided. In the case of high estimated PER, reducing the number of probes improves performance. If estimated PER is low, probing may be done as usual. PER does not affect the number of probes in this case.

If there is non-zero PER on any rate, it can be caused either by insufficient RSSI or by an interferer. In the case of insufficient RSSI, all higher MCS levels will have a higher PER value. In the case of interference causing non-zero PER, it is possible to calculate a minimum possible PER on higher rates as follows. Interferer duration in an exemplary IEEE 802.11n system can vary from 40 µsec (corresponding to the preamble duration in a packet plus 1 symbol) to the full length of corrupted packet. The shorter the interferer duration; the lower will be PER on a higher MCS level. Accordingly, with the minimum duration of interferer, the loss on higher MCS level will be at least $$PEREst_m(n) = PER_k(n) \cdot \frac{r_k}{r_m}.$$

This value is not the same PEREst as was defined above in connection with Stage 1. This value is useful to decide if there is value in changing the MCS level rate from $m_1$ to $m_2$:

if $(1-PEREst_{m_2}(n)) \cdot r_{m_2} < (1-PER_{m_1}(n)) \cdot r_{m_1}$, or, after substitution, if $r_{m_2} - PER_k(n) \cdot r_k < r_{m_1} - PER_{m_1}(n) \cdot r_{m_1}$, then the radio should not select rate $m_2$. Here, $m_1$ is the current MCS rate index, $0 \leq m_1 \leq 15$ $m_2$ is the MCS rate we are estimating, $0 \leq m_2 \leq 15$ k is the MCS rate with non-zero PER such that $m_1 < k < m_2$.

This procedure is modified to conform to the rest of the rate adapt algorithm and to take aging into account. Accordingly, let $k_0$ be a number of current rate, and let k be a number of rate for which we want to calculate $q_k(n)$ such that $k > k_0$. Then for each rate ki between $k_0$ and k (i.e. $k_0 < ki < k$), we can calculate $$q_{ki}(n) = f_A(Age_{ki}(n), PER_{ki}(n)) \cdot r_{ki}$$

and then we can estimate $$q_k(n) \leq qest_k(n) = (1 - PEREst_k(n)) \cdot r_k =$$
$$= \left(1 - (1 - f_A(Age_{ki}(n), PER_{ki}(n))) \cdot \frac{r_{ki}}{r_k}\right) \cdot r_k =$$
$$= r_k - r_{ki} + f_A(Age_{ki}(n), PER_{ki}(n)) \cdot r_{ki}.$$

Therefore, $$q_k(n) \leq r_k - r_{ki} + f_A(Age_{ki}(n), PER_{ki}(n)) \cdot r_{ki}$$

Two more simplifications may be made. First, the limitation on $k_0$(current rate) can be removed. Second, a case for ki=k can be incorporated:

$$q_k(n) = \min_{ki}[r_k - r_{ki} + f_A(Age_{ki}(n), PER_{ki}(n)) \cdot r_{ki}],$$

where ki≤k. Or, using relations from Stage 4, $$q7_k(n) = \min_{ki}[r_k - r_{ki} + q4_{ki}(n)], \text{ where } 1 \leq ki \leq k.$$

Implementing this relation in a data processing system requires an inner loop (from i to k) for each k. Complexity of this formula is $O(K^2)$, where K is a number of available rates. Accordingly, optimization is desirable.

Rewriting, $$q7_k(n) - r_k = \min_{ki}[q4_{ki}(n) - r_{ki}],$$

where 1≤ki≤k, but $$\min_{ki}[q4_{ki}(n) - r_{ki}] = \min[q4_k(n) - r_k, \min_{ki}[q4_{ki}(n) - r_{ki}]],$$

where 1≤ki≤k−1, can be optimized as follows $$q7_1(n) = q4_1(n),$$

$$q7_k(n) - r_k = \min[q4_k(n) - r_k, q7_{k-1}(n) - r_{k-1}]$$

for any k>1, or $$q7_1(n) = q4_1(n),$$

$$q7_k(n) = \min[q4_k(n), q7_{k-1}(n) + r_k - r_{k-1}] \text{ for any } k > 1.$$

Stage 7, Part 1 (Continued). Modification for Dual-Stream Rates. As noted above, in some applications more than a single stream of data may be communicated between radios. However, the relation that is described above is suitable only in cases when the radio uses the same-stream rates. More specifically, the above relation is usable in cases when rates with higher MCS index have higher number of bits per symbol, i.e. when (1) all rates have ascended ordering and (2) the difference between highest single-stream rate and lowest dual-stream rate is at least 8. For example, this relation will work with the set of rates or MCS levels MCS1, MCS9, MCS10, but will not work with the set of MCS levels MCS2, MCS3, MCS9, MCS10. The failure occurs because the algorithm tries to estimate minimum loss on MCS9 using loss on MCS2 and MCS3. This is incorrect.

If it is desired to use all single-stream rates and all dual-stream rates in the same algorithm, the algorithm should be modified to take into account dependency between single-stream and dual-stream rates. For example, MCS11 is dependent on MCS10, MCS9, MCS3, MCS2, MCS1, but is not dependent on MCS4, MCS5, MCS6 and MCS7. To consider these dependencies, the relation above can be modified in the following way.

$$q7_k(n)=q4_k(n) \text{ for } k=1,$$

$$q7_k(n)=\min[q4_k(n),q7_{k-1}(n)+r_k-r_{k-1}]$$

for any $2 \le k \le 7$, $$q7_k(n)=\text{Min}[q4_k(n),q7_{k-8}(n)+r_k-r_{k-8}]f$$

for $k=9$, $$q7_k(n)=\min[q4_k(n),q7_{k-1}(n)+r_k-r_{k-1},q7_{k-8}(n)+r_k-r_{k-8}]$$

for any $10 \le k \le 15$.

This relation is not defined for $k=0$, $k=8$. If it is desired to extend the algorithm for these values, the limits for k may be modified as follows:

$$q7_k(n)=q4_k(n)$$

for $k=0$, $$q7_k(n)=\min[q4_k(n),q7_{k-1}(n)+r_k-r_{k-1}]$$

for any $1 \le k \le 7$, $$q7_k(n)=\min[q4_k(n),q7_{k-8}(n)+r_k-r_{k-8}]$$

for $k=8$, $$q7_k(n)=\min[q4_k(n),q7_{k-1}(n)+r_k-r_{k-1},q7_{k-8}(n)+r_k-r_{k-8}]$$

for any $9 \le k \le 15$.

Stage 7, Part 2: Aging Speed (Lower Rates should be Aged Faster than Higher Rates). As proposed by Stage 2, $q2_k(n)$ values are adjusted by introducing aging. But the value $q2_k(n)$ still depends on $r_k$ value, so higher rates or MCS levels will be aged faster than lower rates. This is not desired, since in the same case when there a lot of unacceptable MCS levels, MCS15 will be aged faster than any other rate. As a result, the algorithm will select MCS15, send some probes, return back, a bit later select MCS14, send some more probes, and so on. Instead, what is desired is to start probes from lowest rate, and to not repeat probes on higher rates if possible, as described in Stage 7, part 1.

Accordingly, it should be ensured that, under the same conditions, aging for lower rates will be faster than aging for higher rates. Therefore, aging coefficients are introduced to adjust the age value for each rate.

The relation is unchanged:

$$f_A(a, p) = 1 - \frac{p \cdot c^4}{a^4 + c^4}$$

but parameter c becomes variable:

$$c_k = c_1 \cdot \frac{r_k}{r_1},$$

where $c_1$ is an initial rate threshold. One exemplary value as a default for this threshold is 100.

Stage 8, Part 1: Too Old Age and Min_Stepping Mechanism. It is possible that no data was sent from the radio during an extended period of time. In this case, aging for several rates can produce similar results for different rates or MCS levels. However, the algorithm must select only one rate or MCS level and send a probe on the selected rate. But as described above in connection with Stage7, part 2, it is preferable to select lower rates for probing before higher rates.

Consider the following corner case. During some period of time, let $PER_1=0\%$, $PER_2=100\%$, $PER_3=100\%$, $PER_4=100\%$, $PER_5=50\%$. If the radio selects MCS5 and experiences a high number of retries, Stage 4 would periodically operate to reduce the rate. It may occur that, with given PER values, the radio cannot select MCS2, MCS3 nor MCS4 due to high historical PER on those rates. As a result, the radio would select MCS1. But if the radio operates on MCS1 and experiences a low number of retries, $q_5$ would be definitely higher than $q_2$, regardless of whether MCS2 was aged or not. Probably $q_4$ could be higher than $q_5$, so the transmitting radio may select MCS4 instead of MCS5 in case if it was aged, but the radio could not select MCS2. As a result, every time the radio needed to reduce rate from MCS5, the radio would select MCS1, and would never try MCS2. But it may be that channel conditions have already changed, and MCS2 has become acceptable. Accordingly, it is desired to probe on MCS2. The algorithm should not probe when the number of retries is high. The radio shouldn't probe during jump down. Accordingly, in some embodiments, probing is done by forcing a probe on MCS2 instead of selecting a higher MCS level.

Therefore, a "min_stepping" mechanism is introduced to force probes instead of jumps to higher rates. The mechanism is described as follows. If a new rate k(n), selected by arg max$_k$ $q7_k(n)$, is higher than the current rate k(n−1), then the radio should check all rates or MCS levels between k(n) and k(n−1). If at least one of those rates has a too-old age, then the algorithm should select that rate instead of k(n).

To strictly define this stage, it is necessary to define what a "too-old age" is. Some embodiments may define it in the following way:

if $Age_k(n)$>TOO_OLD_AGE,set $Age_k(n)$= TOO_OLD_AGE

One possible value for TOO_OLD_AGE is 2000.

Also, it is necessary to define what is meant by "higher" and "between" in the proposal above. To do this, the algorithm may sort all rates by bitrate in order to assign a temporary index for each rate based on sorting order, and to consider a rate with higher temporary index to be higher than a rate with lower temporary index.

If two rates have the same bitrate (for example, MCS3 having 104 bits per symbol, and MCS9 also having 104 bits per symbol), the algorithm may consider the single-stream rate to be higher than the double-stream rate since the preamble for double-stream rates is longer than preamble for single-stream rates, so that in general, double-stream rates are a bit more expensive than single-stream rates with the same bitrate.

The following shows the result of sorting:

0, 8, 1, 2, 9, 3, 10, 4, 11, 5, 6, 7, 12, 13, 14, 15

In one example, if the current rate is MCS9, the new selected rate is MCS14. However, MCS4 and MCS10 both have age 2000. In this example, the algorithm should select MCS10 because it has a lesser index in the table above than MCS4.

Stage 8, Part 2: Limitation for Probe Frequency. As defined by Stage 6, each rate has its own aging formula, so it is theoretically possible that several rates become aged simultaneously or with a small delay. In such a case, the algorithm tries to make several probes simultaneously. If all aged rates are bad, the algorithm increases the number of re-transmits. This has the effect of increasing total latency.

To avoid the increase in latency, the algorithm introduces one more limitation. The algorithm ensures that the min_stepping mechanism doesn't operate too frequently. To do this, the algorithm disables the min_stepping mechanism for a time period defined by min_step_limit scheduling frames since last min_step. An example value for min_step_limit is 10 scheduling frames.

Stage 9: Using PER on First Retry

In some circumstances, it is possible for the observed packet error rate to increase suddenly for a short period of time. In this case, the transmitting radio implementing the present method will try to select another rate. The transmitting radio will probably reduce the rate. The transmitting radio will not return back to the current rate until the aging mechanism has decided to probe on the previous rate. However, aging time can be much longer than the interference presence time, with the result that throughput can be degraded.

To avoid throughput degradation, a decision to reduce rate should be delayed for a while, to first determine if the observed PER change is short or long in duration. If the observed PER rate change is a relatively short duration, there is no need to reduce rate. However, if the observed PER change is of a relatively long duration, the rate may be reduced. Stage 9 of the rate adapt algorithm introduces a process for resolving such a problem. Stage 9 operates to have different PER values for each possible number of retries:

$$PERretr_k(n,r) = PERretr_k(m,r) \cdot K_{old} + InstantPERretr(r) \cdot K_{new},$$

where $$InstantPERretr(r) = 1 - \frac{\sum_{i=0}^{r} acked(i) + \sum_{i=0}^{r-1} nacked(i)}{sent},$$

acked(i) is a number of packets delivered exactly after i unsuccessful attempts to deliver a packet, and nacked(i) is a number of packets undelivered exactly after i unsuccessful attempts to deliver a packet. Using the definitions provided above, the formula for InstantPERretr can be simplified:

$$InstantPERretr(r) = \frac{\sum_{i=r}^{N} nacked(i)}{sent},$$

where N is maximum allowed number of retries.

With the given formula for $PERretr_k(n,r)$, we can redefine $PER_k(n)$ as follows:

$$PER_k(n) = \begin{cases} PERretr_k(n, 0), & \text{if } \{prev\_rate \neq k\} \text{ or } \{k(m) < prev\_rate\} \\ PERretr_k(n, 0), & \text{if } \{R(n) > 1\} \\ PERretr_k(n, 1), & \text{otherwise} \end{cases},$$

where k(m) is an MCS index of the rate that was selected for transmission during the m'th scheduling cycle, prev_rate is the MCS index selected for previous transmission, m is scheduling cycle number such that n−m≤stage9_limit, R(n) is retry index on scheduling cycle n, stage9_limit is any suitable value, for example 10.

In other words, the algorithm can use $PER_k(n)=PERretr_k(n, 0)$ when (1) the rate for which the algorithm calculates PER is not the same rate as was selected for previous transmission, or (2) the rate was increased recently, or (3) the retry index is greater than 1. Otherwise, we use $$PER_k(n) = PERretr_k(n,1).$$

Alternatively, the algorithm can make a preference for the rate which was successfully used recently.

Note that, for dual-stream rates (or for non-MCS rates), the condition k(m)<prev_rate may be rewritten in more complicated form, to compare not MCS indexes but rates order for any given order. For example, the order of MCS indexes defined above in Stage 8 can be used: 0, 8, 1, 2, 9, 3, 10, 4, 11, 5, 6, 7, 12, 13, 14, 15. Using this order, we assume a special comparison when an item with lower index is considered less than an item with higher index, i.e. 0<8<1<2<9 and so on.

Figure 5:
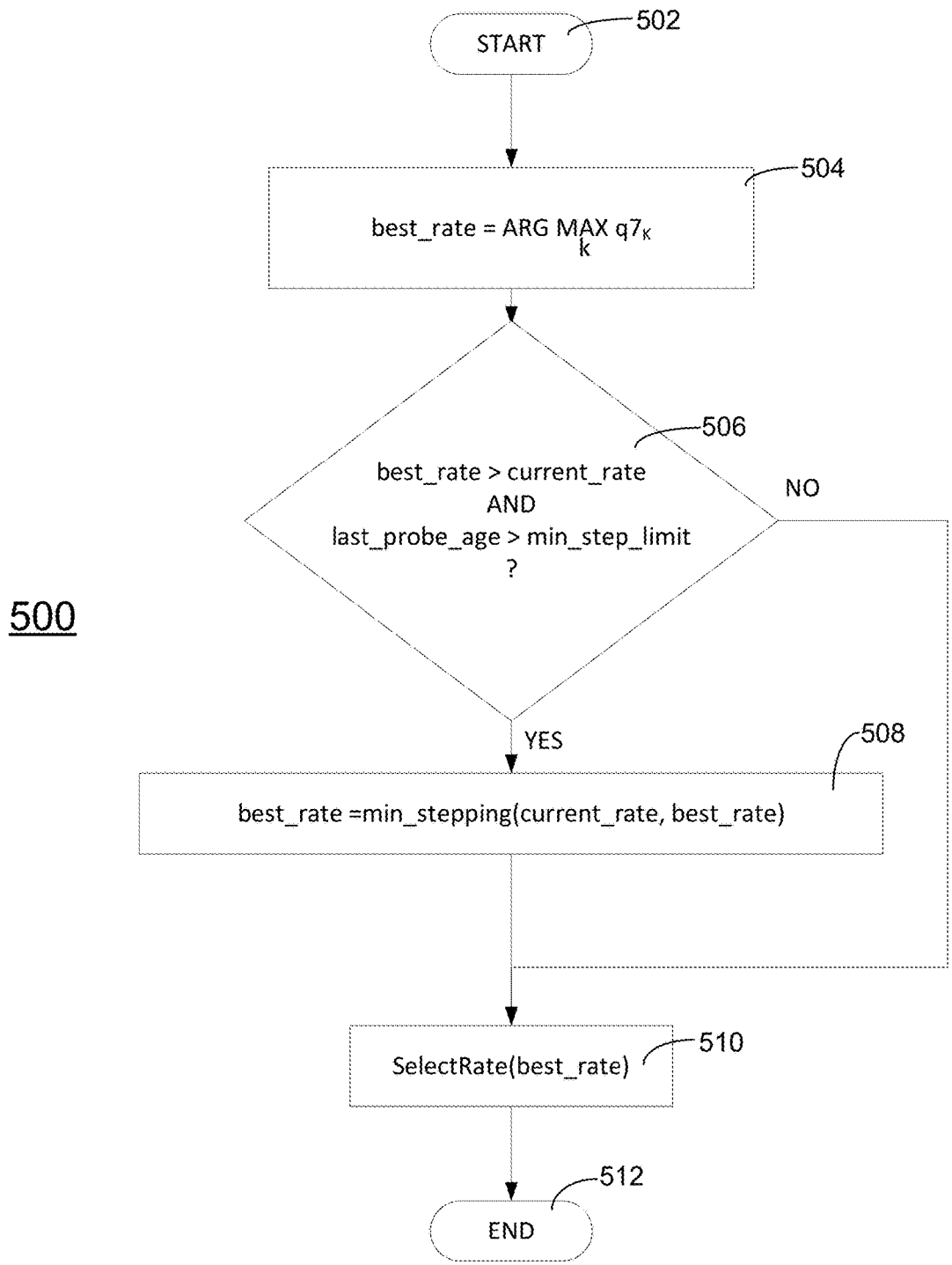
FIG. 5 is a flow diagram illustrating an exemplary embodiment of a method of rate selection in a radio device for use in the radio communication system of FIG. 1.

FIG. 5 is a flow diagram illustrating a method 500 of rate selection in a radio device. The method 500 may be implemented in any suitable radio device. Typical examples include radios operating in an IEEE 802.11n WiFi system. Such typical radios include an access point such as AP 102 and subscriber modules such as SM 104 and SM 106 illustrated in FIG. 1. The method 500 includes in an exemplary embodiment a series of processing steps to be performed by the radio device. The processing steps may be performed by one or more processors executing data and instructions stored in a memory, such as the network interface 208 of AP 202 and the network interface of client device 204 illustrated in FIG. 2. The method steps may rely on associated data collection and processing activities such as determination of received signal strength indication (RSSI), carrier to interference and noise ratio (CINR) and packet error rate (PER). Such associated data collection may be done by receiving relevant data and information from a remote radio or network device, or by measuring signal levels or tracking data at the radio device itself. For example, the radio device may transmit probes and receive ACK and NACK messages from a remote radio. The ACK and NACK messages are processed to develop statistics. Such statistics may be indicative of the PER.

The method begins at block 502. The method may begin in response to any suitable condition or variation. For example, the method may begin when the radio device is turned on and becomes active on the network. Alternatively, the method may begin when the radio device seeks to transmit a packet and needs to select a rate or MCS level to use for the transmission. Still further, the method may be processed continually as information such as packet error rate, RSSI and CINR are updated.

Figure 6:
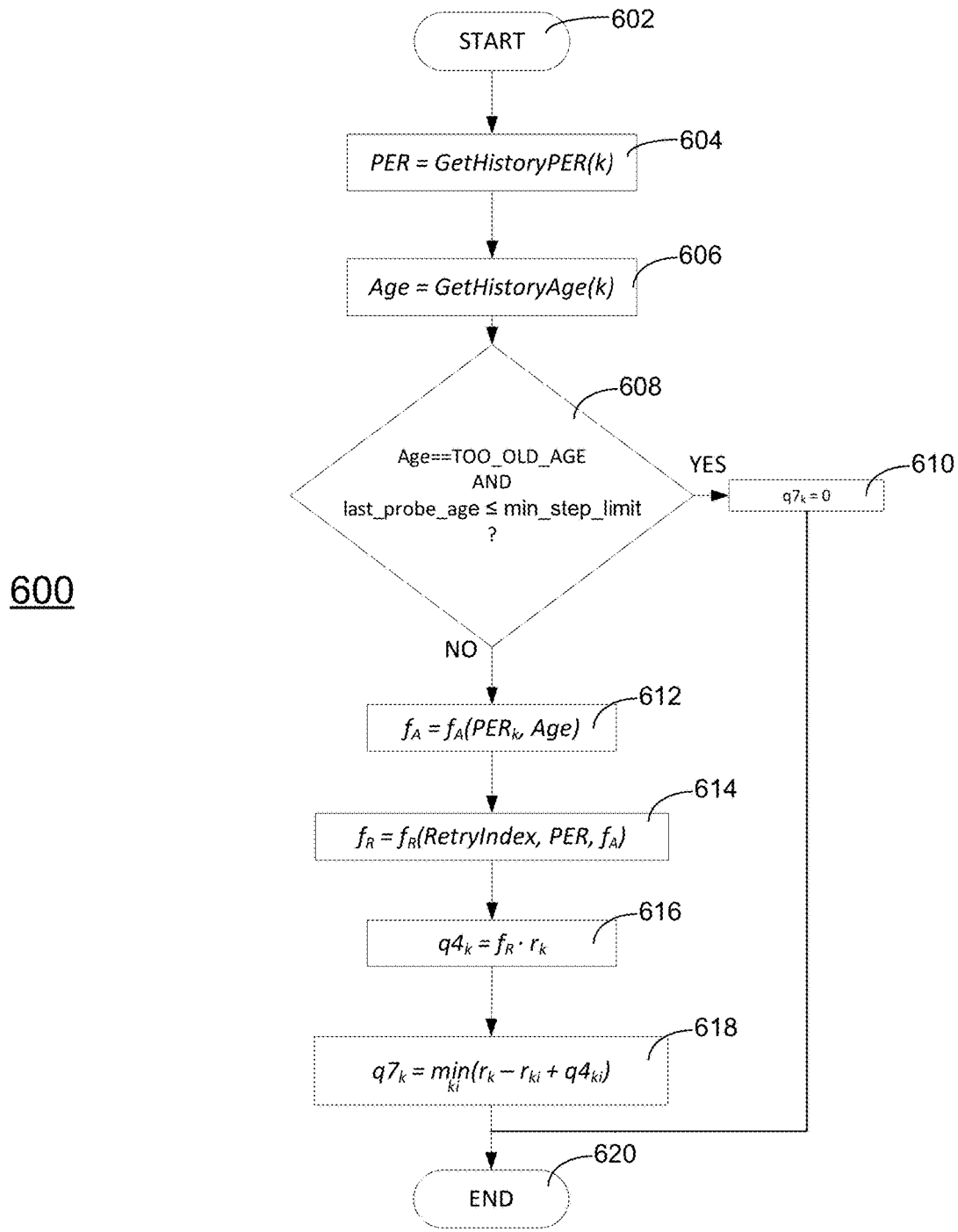
FIG. 6 is a flow diagram illustrating an exemplary embodiment of a method for calculating the best particular data rate among all of the available data rates for use in the radio communication system of FIG. 1.

At block 504, the method determines a current best rate as a maximum value of the variable $q7_k$, described above. In one embodiment, $q7_k$ may be derived as $q7_k(n) = \min[q4_k(n), q7_{k-1}(n) + r_k - r_{k-1}]$ for any k >1. FIG. 6, discussed below, illustrates a simplified example of calculation of $q7_k$ calculation. The $q7_k$ values may be stored in an array or matrix for easy manipulation by a processor, with a rate value of k as an index. In one embodiment, the rates k correspond to MCS levels for IEEE 802.11n. Other rates may be used as the method is extended to other applications and other technologies.

At block 506, a logical test is performed. It is determined if, first, the value for best_rate established in block 504 exceeds the current rate being used. For example, the current rate may be MCS9, which may be read from a stored data location, and the best_rate determined at block 504 may be determined to be MCS10. A second logical test is performed at block 506 to determine if the last probe age exceeds a minimum step limit.

If both logical tests of block 506 pass, control proceeds to block 508. There, the value for the best_rate is set to the result of the function min_stepping with the current rate and the best_rate determined at block 504 as arguments. The minimum stepping operation is described above to force probe transmissions on rates that might otherwise be avoided based on aged PER data. Control then proceeds to block 510.

If one or both of the logical tests of block 506 fail, control proceeds directly from block 506 to block 510. At block 510, the selected rate to use for a next packet transmission is the value of the variable best_rate. The method ends at block 512 and the selected rate is returned for further processing.

FIG. 6 is a flow diagram illustrating an exemplary embodiment of a method 600 for calculating the variable $q7_k$. As noted above, this value corresponds to an indication of quality of a particular rate or MCS level specified by the MCS index k. The method begins at block 602. The method may begin operation due to any suitable initiating event, such as receipt of new or updated information about RSSI or CINR or occurrence of an event such as the need to transmit a packet. The method may be implemented as a set of instructions and data that may be accessed by a processor of a radio device operating, for example, in an IEEE 802.11n radio communication network. However, the techniques illustrated and described in conjunction with the drawings may be extended to other devices and systems as well.

At block 604, the method begins by retrieving stored historical data about packet error rates experienced by the radio device. In one aspect of operation, the radio device routinely determines a packet error rate for each data rate k being used. As noted, the data rate k may refer to the MCS index used in an 802.11n system. Thus, the stored PER data may include an array of data stored by timestamp or other indication of the age of the data and stored by rate k. The PER data may be determined using any suitable technique. In one exemplary technique, the radio device sends probe transmissions and determines if the probe transmissions were reliably received. In one particular embodiment, an Automatic Repeat-request (ARQ) mechanism is used in which packets sent by the radio device over a wireless medium can be monitored for receipt. The intended receiver responds with an ACK transmission, a NACK transmission or no transmission at all, providing an indication of success of receipt and therefore an indication of packet error rate.

At block 606, the method retrieves stored historical data about age of PER data for each respective rate k. The data defines the time since PER data for each rate or MCS index was updated. The data may be stored and retrieved in any suitable manner.

At block 608, a logical determination is made about the age of the PER data for each rate k. In a first logical test, it is determined if the age data retrieved at block 606 are considered too old. The age value for each rate k is compared with a threshold value labelled TOO_OLD_AGE. Any value may be used for this threshold value. An example value is 2000.

Further at block 608, a logical determination is made about the minimum stepping procedure. As noted above, to eliminate issues of latency, embodiments of the method ensure that the minimum stepping procedure is not performed too frequently. Thus, a value for the age of the last probe for any rate, labelled last_probe_age, is compared with the threshold value labelled min_step_limit. Any suitable value, such as 10 scheduling frames may be used for the min_step_limit.

If both logical determinations of block 608 are met, control proceeds to block 610. This will be true for a given rate k if its PER data matches the too old age threshold and if the last probe on any rate was sent more recently than the minimum step limit. If these conditions are both true, at block 610 the value for $q7_k$ is set to a value of 0 or other value which ensures the rate will not be selected.

If either logical determination of block 608 fails, control proceeds to block 612. At block 612, the function $f_A$ is evaluated to determine weighting given to the rate k based on aging of the PER data for rate k. An exemplary relation for $f_A$ is specified above. Other relations may be used as well.

At block 614, the function $f_R$ is determined for rate k. The function $f_R$ uses a retry index to determine how many retries have been made when sending a given frame. An exemplary relation for $f_R$ is specified above.

At block 616, the value is determined. This term represents an indication of weight of a particular rate or MCS level specified by the MCS index k, taking into account aging and retry data for the rate k. An exemplary relation for the determination of the value $q4_k$ is provided above.

Subsequently, using the value $q4_k$ a value $q7_k$ is determined at block 618. This may be determined using the formula shown in FIG. 6. Thus, the value of $q7_k$ is selected based on the value of rates evaluated over rate k, the rate being evaluated, and rate i which represents all rates between the current rate $k_0$ and rate k, and $q4_k$ as determined in block 616. The value of $q7_k$ is returned and the method 600 of FIG. 6 ends at block 620.

Figure 7:
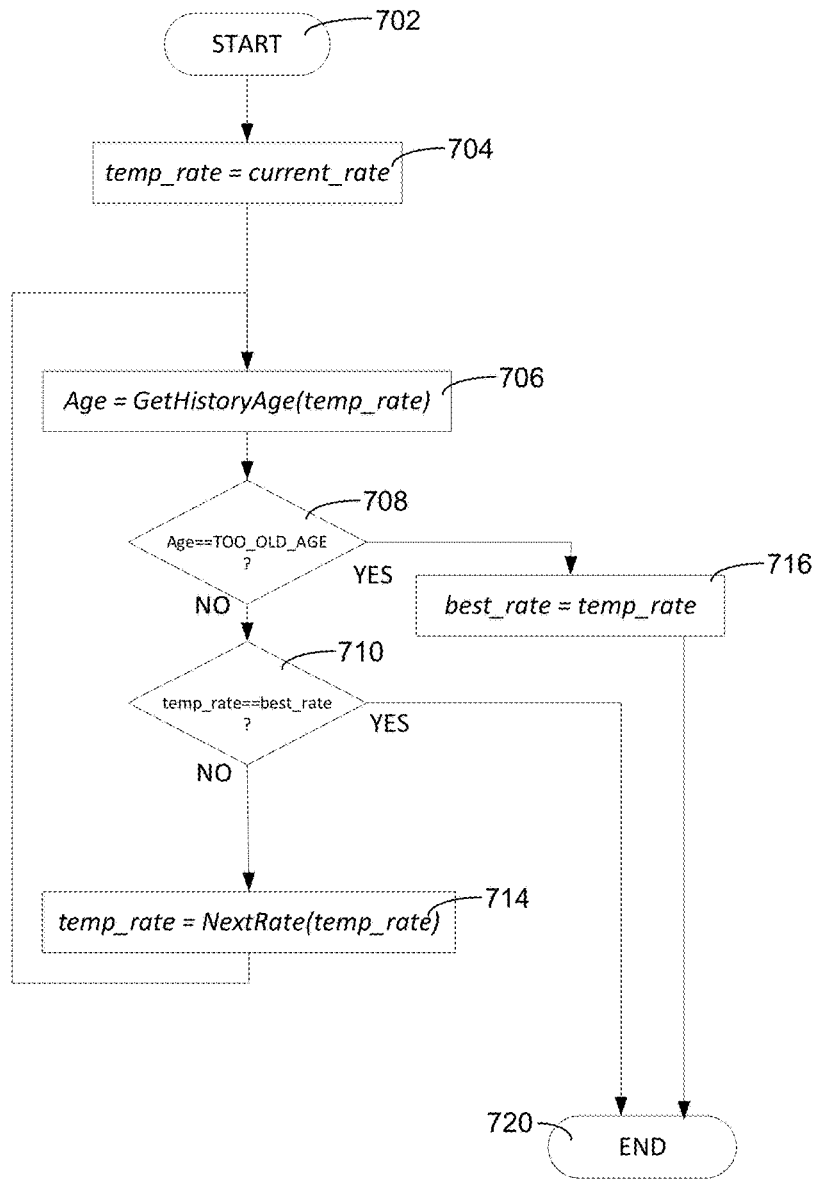
FIG. 7 is a flow diagram illustrating an exemplary embodiment of an algorithm for finding a higher rate than the current rate should it be determined that these higher rates have not been used for too long a period with the rate selection method of FIG. 5.

FIG. 7 is a flow diagram illustrating an exemplary embodiment of a method 700 for determining a minimum stepping procedure for use with the rate selection method of FIG. 5. The minimum stepping procedure may be useful in a case where PER data is aged and may no longer be reliable. Under certain conditions, the stored PER data would prompt the rate adapt algorithm to select a higher rate. Since the PER data is aged, it may be desirable to select rates having aged data and probe to determine current PER information. However, probing for lower data rates may be preferred to probing at higher data, as discussed above. The minimum stepping procedure operates to force probes at lower rates rather than selecting higher rates.

The method 700 begins at block 702. The method 700 may be implemented as a set of instructions and data that may be accessed by a processor of a radio device operating, for example, in an IEEE 802.11n radio communication network. However, the techniques illustrated and described in conjunction with the drawings may be extended to other devices and systems as well. The method may begin due to any appropriate situation. One example might be the aging of packet error rate data stored at a radio device along with the determined need to probe for new PER data.

At block 704, a variable temp_rate is set equal to the current data rate, which may be the current MCS index value. At block 706, the variable temp_rate is used to retrieve stored historical data about age of PER data for the current rate. The stored data defines the time since last updating of PER data for the rate or MCS index defined by the value temp_rate. The data may be stored and retrieved in any suitable manner.

At block 708, a logical determination is made about the age of the PER data for the age data retrieved at block 706. It is determined if the age data retrieved at block 706 are considered too old. The age value for the current rate is compared with a threshold value labelled TOO_OLD_AGE. Any value may be used for this threshold value. An example value is 2000.

If the logical determination of block 708 concludes that the age value is other than the threshold value TOO_OLD_AGE, at block 710, it is determined if the current value of the variable temp_rate is set equal to the value of the variable best_rate. If not, control proceeds to block 714 where the variable temp_rate is set to the result of procedure NextRate using the current value of temp_rate as the argument. Procedure NextRate requires an ordered list or rates and operates to select the next rate from the list. In systems with both single-stream and dual-stream MCS rates, it may use a data array described above in connection with single-stream rates and double-stream rates. In one example, NextRate(4)=11, NextRate(7)=12, NextRate(12)=13. In systems with only single-stream rates, the procedure may just select the next MCS index. For example, NextRate(4)=5, NextRate(6)=7. In systems with some another set of rates, such as non-802.11n systems, it should use its own list of rates to determine what a NextRate is. Control then returns to block 706 where age data for the new value of temp_rate is retrieved.

If, at block 708, it was concluded that the retrieved age data was set equal to the threshold value TOO_OLD_AGE, at block 716, the value of variable best_rate is set equal to the current value of temp_rate. This value is returned and the procedure ends at block 720. As explained above, if a new rate k(n), selected by arg max$_k$ q7$_k$(n), is higher than the current rate k(n−1), then the radio device should check all rates or MCS levels between the selected new rate k(n) and the current k(n−1), where n identifies the frame. If at least one of those intermediate rates has a too-old age, then the algorithm should select that rate instead of k(n) as the best rate to use.

On the other hand, if at block 710, if it was determined that the current value of the variable temp_rate is already equal to the value of the variable best_rate, the value best_rate is returned and the procedure ends at block 720.

From the foregoing, it can be seen that the presently disclosed embodiments provide method and apparatus for an improved rate scan algorithm in a radio device. The method for a rate adapt algorithm probes different data rates or MCS level to learn what is the best MCS level to use for a particular time. The method includes determining success percentages for MCS levels based on the response to the probes. All MCS levels may be probed or a subset of the MCS levels may be probed. The method also includes determining an estimated throughput for each MCS. Further, the method includes selecting the MCS level that gives the maximum throughput for a link.

The disclosed method and apparatus allow the right MCS to be determined for any type of environment in which the radio device may operate, such as only link budget-constrained, only interferer-constrained, or some combination of link budget and interferers. An aging mechanism is employed to increase the rate weight for those MCS levels which have not been used for a long time.

The disclosed rate adapt algorithm may employ a mechanism to force a more robust MCS rate (i.e. the MCS rate with the lowest PER) in case the number of undelivered packets starts to grow. This allows loss-sensitive and latency-sensitive protocols, (such as Transmission Control Protocol TCP), to work more reliably in high interference conditions. Also, the disclosed rate adapt algorithm contains special processing for cases when there was no traffic for a long time.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. Further, various aspects of the disclosed method and apparatus have been described as stages with an assigned number. It is to be noted that these descriptive aspects are included solely for discussion and no further conclusion is to be drawn. The operations associated with each stage or other descriptive aspect may be performed in any suitable order and no other ordering is intended or implied. It is therefore intended that the foregoing detailed description be regarded as illustrative rather than limiting, and that it be understood that it is the following claims, including all equivalents, that are intended to define the spirit and scope of this invention.

The invention claimed is:

1. A method of adapting a data rate on a channel operating at a current data rate for a radio device, the method comprising:

transmitting one or more packets from the radio device on the channel at the current data rate;
collecting respective measurement results comprising packet error rates on the channel for radio transmissions by the radio device to a remote radio for respective data rates of a plurality of data rates;
determining a respective weight value for each respective data rate of the plurality of data rates on a basis comprising the measurement results;
determining respective age values for each respective data rate of the plurality of data rates; and
determining weighting adjustment values using the respective age values for each respective data rate of the plurality of data rates so that older respective weight values are favored when identifying a maximum weight value of the determined respective weight values, wherein determining weight adjustment values for each respective data rate comprises determining weighting respective adjustment values so that respective data rates having relatively lower data rates are favored over respective data rates having relatively higher data rates;
adjusting the respective weight values by the respective weighting adjustment values;
identifying the maximum weight value of the adjusted respective weight values;
selecting a data rate of the plurality of data rates which is associated with the maximum weight value; and
if the best rate value exceeds the current data rate, transmitting a packet from the radio device on the channel at the selected data rate.

2. The method of claim 1 wherein collecting respective measurement results comprising packet error rates comprises:
transmitting messages on the channel to one or more remote radios at the respective data rates;
detecting acknowledgement of the transmitted messages by the one or more remote radios; and
maintaining statistics about success or failure or both of receipt of the transmitted messages by the one or more remote radios; and
determining respective packet error rates using the statistics.

3. The method of claim 2 wherein maintaining statistics comprises counting ACK messages, NACK messages and absent responses from the one or more remote radios in response to the transmitted messages.

4. The method of claim 1 further comprising:
if the selected data rate exceeds the current data rate, for all intermediate data rates of the plurality of data rates between the selected data rate and the current data rate value,
determining a respective age value for each respective intermediate data rate,
comparing the respective age value with a too-old age threshold value, and
using as the best rate value a respective intermediate data rate having a respective age value exceeding the too-old age threshold.

5. The method of claim 1 wherein the plurality of data rates correspond to Modulation and Coding Scheme index values for an IEEE 802.11n system.

6. A radio device comprising:
an automatic repeat-request circuit configured to communicate probe requests to remote radio devices at selected data rates on a channel;
a receiving circuit configured to process responses to the probe requests and to store in a memory circuit measured data about success rates of the probe requests at the selected data rates on the channel;
a rate selection circuit configured to select a current data rate for transmitting a packet to a remote radio on the channel using the measured data about success rates of the probe requests;
a transmitter circuit to transmit the packet to the remote radio on the channel at the selected current data rate;
a rate adapting circuit configured to select a new data rate for transmitting subsequent packets to the remote radio on the channel using the measured data about success rates of the probe requests; and
an aging circuit configured to determine relative age values for estimated packet error rates and to adjust an estimated weight for each selected data rate using the relative age values to increase likelihood of selection of a relatively older data rate as the current data rate, wherein the aging circuit is configured to differentially adjust the estimated weight for each selected data rate using the relative age values so that relatively lower data rates of the selected data rates are aged faster than relatively higher data rates of the selected data rates.

7. The radio device of claim 6 wherein the receiving circuit is configured to estimate a packet error rate using the responses to the probe requests and further configured to estimate a weight for each selected data rate using the packet error rate and a rate of data transmission for the selected data rate.

8. The radio device of claim 6 wherein the aging circuit is further configured to determine a number of packet transmissions for the selected data rates and to adjust the estimated weight for each selected data rate using the number of packet transmissions.

9. The radio device of claim 6 wherein the aging circuit is configured to compare the relative age values with a too-old threshold to identify data rates which have not been recently used, and wherein the rate adapting circuit comprises a minimum stepping circuit operative to determine if the new data rate for transmitting subsequent packets is higher than the current data rate, and wherein the rate selection circuit selects an identified data rate which has not been recently used and which is a data rate higher than the current data rate.

10. The radio device of claim 7 further comprising a retry circuit configured to determine a number of retry attempts made to transmit the packet after unsuccessful communication of the packet and wherein the rate selection circuit is responsive to the number of retry attempts to adjust the estimated weight for each selected data rate using the number of retry attempts to reduce likelihood of selection of a current data rate having a relatively high probability of packet loss.

* * * * *